United States Patent [19]

Silfvast et al.

[11] 4,388,720
[45] Jun. 14, 1983

[54] EXTERNAL CONTROL OF RECOMBINATION RATE FOR ELECTRON-ION RECOMBINATION LASERS

[75] Inventors: William T. Silfvast, Holmdel; Leo H. Szeto, Howell, both of N.J.; Obert R. Wood, II, New York, N.Y.

[73] Assignee: Bell Telephone Laboratories, Incorporated, Murray Hill, N.J.

[21] Appl. No.: 251,168

[22] Filed: Apr. 6, 1981

[51] Int. Cl.³ .............................................. H01S 3/097
[52] U.S. Cl. ...................................... 372/76; 372/56; 372/82
[58] Field of Search ...................... 372/76, 56, 69, 81, 372/82

[56] References Cited

U.S. PATENT DOCUMENTS 4,295,103 10/1981 Ljudmirsky ........................... 372/82

OTHER PUBLICATIONS

Gudzenko et al., "Negative Absorption in a Nonequlibrium Hydrogen Plasma", *Sov. Phys. JETP*, vol. 18, No. 4, Apr. 1964, pp. 998–1000.
Zeldovich et al., "Electron–Ion Recombination by Three-Body Collisions", *Physics of Shock Waves and High Temperature Hydrodynamic Phenomena*, vol. I, Academic Press 1966, pp. 406–408.
Silfvast et al., "Recombination Lasers in Expanding $CO_2$ Laser–Produced Plasmas of Argon, Krypton and Xenon", *APL*, vol. 31, No. 5, Sep. 1977, pp. 334–337.
Zhukov et al., "Recombination Lasers . . . ", *Sov. Jour. Quantum Electron*, vol. 7, No. 6, Jun. 1977, pp. 704–708.
Boulmer et al., "Collisional–Radiative Transfer Between Rydberg States of Helium and Electronic Recombination of $He^+$", *Phys. Rev. A.*, vol. 15, No. 4, Apr. 1977, pp. 1502–1512.

*Primary Examiner*—James W. Davie
*Attorney, Agent, or Firm*—Michael B. Einschlag; Erwin W. Pfeifle

[57] ABSTRACT

The present invention comprises an apparatus which provides a combination of excitation pulses or a signle shaped excitation pulse to a plasma-recombination laser which both creates the plasma and controls the electron-ion collisional recombination rate therein. The application of the single shaped excitation pulse or combination of excitation pulses keeps the electron temperature of the plasma at a temperature unfavorable to recombination until the electron density has fallen into the optimum range for laser action. The termination of the excitation pulse or pulses results in immediate laser action having power at least several orders of magnitude over that achieved in the prior art.

11 Claims, 18 Drawing Figures

EXTERNAL CONTROL OF RECOMBINATION RATE FOR ELECTRON-ION RECOMBINATION LASERS

BACKGROUND OF THE INVENTION

The present invention pertains to the field of plasma recombination lasers.

The idea of producing a population inversion during plasma recombination was first proposed in an article entitled, "Negative Absorption in a Nonequillibrium Hydrogen Plasma", *Sov. Phys. JETP*, Vol. 18, 1964, pp. 998–1000 by L. I. Gudzenko and L. A. Shelepin. Experimental observations of lasers of this type were made in 1977. The population inversion mechanism responsible for these lasers has been discussed in an article entitled "Recombination Lasers in Expanding $CO_2$ Laser-Produced Plasmas of Argon, Krypton, and Xenon", *Applied Phys. Letts.*, Vol. 31, 1977, pp. 334–337 by W. T. Silfvast, L. H. Szeto and O. R. Wood and in an article entitled "Recombination Lasers Utilizing Vapors of Chemical Elements. I. Principles of Achieving Stimulated Emission Under Recombination Conditions", *Sov. J. Quantum Electron.*, Vol. 7, 1977, pp. 704–708 by V. V. Zhukov, E. L. Latush, V. S. Mikhalevskii and M. F. Sem.

FIG. 1 illustrates the population inversion mechanism, where $E^{Z+}$ denotes the ground state of the $Z^{th}$ ionization stage of element E and $E^{(Z+1)+}$ denotes the ground state of the $(Z+1)^{th}$ ionization stage. During the heating phase of the plasma, step 1 in FIG. 1, a highly ionized plasma at high density is formed by an electrical discharge or a laser-produced plasma. At this time, the atoms of element E are excited, preferably within a gaseous medium, and some fraction are ionized into stage $E^{(Z+1)+}$. After formation, the plasma is allowed to expand, illustrated as step 2 in FIG. 1. During this expansion phase, plasma electrons are cooled via collisions with the surrounding gases. As a consequence of this cooling the electron-ion recombination rate is significantly increased. The recombining electrons move downward in energy, via collisions with the free electron continuum, through the highly excited states of $E^{Z+}$, step 3 in FIG. 1, until a significant gap in the energy levels of that charge state is reached. The reduced collisional decay rate across the gap creates a bottleneck, which bottleneck causes a population inversion to develop with respect to one or more lower levels. Laser action is achieved on transitions across the gap when a high decay rate exists for the lower level of such a transition.

The importance of the electron temperature on the electron-ion collisional recombination process is well known. The total three-body recombination rate for hydrogen-like ions $(\tau_3)^{-1}$ is given by the equation found in *Physics of Shock Waves and High Temperature Hydrodynamic Phenomena*, Vol. I, Academic Press, New York, 1966, by Ya. B. Zeldovich and Yu. P. Raizer $$(\tau_3)^{-1} = 8.75 \times 10^{-27} Z^3 N_e^2 T_e^{-4.5}, \quad (1)$$

where Z is the nuclear charge, $N_e$ is the electron density and $T_e$ is the electron temperature. This collisional recombination process is much more sensitive to temperature, $T_e^{-4.5}$, than is the radiative recombination process, $T_e^{-0.75}$. In fact, when a plasma is completely ionized, the plasma will not relax unless the plasma electrons are allowed to cool. An article entitled, "Collisional-Radiative Transfer Between Rydberg States of Helium and Electronic Recombination of $He^+$", *Phys. Rev. A*, Vol. 15, 1977, pp. 1502–1512 by J. Boulmer, F. Devos, J. Stevefelt and J. F. Delpech discloses that the emission from a recombining plasma can be quenched by heating the electrons with an external source. In fact, an article entitled, "Ultra-High-Gain Laser-Produced Plasma Laser in Xenon Using Periodic Pumping", *Appl. Phys. Lett.*, Vol. 34, 1979, pp. 213–215, by W. T. Silfvast, L. H. Szeto and O. R. Wood discloses the fact that the plasma cooling rate has a dramatic effect on the output from a $CO_2$ laser-produced plasma recombination laser in xenon.

SUMMARY OF THE INVENTION

The present invention comprises an apparatus which provides a suitable combination of excitation pulses or single shaped excitation pulse to a plasma-recombination laser, which excitation pulse or pulses control the electron-ion collisional recombination rate. The application of the excitation shaped pulse or pulses creates the plasma and maintains the electron temperature of the plasma at a temperature unfavorable to recombination until the electron density has fallen into the optimum range for laser action. The termination of the excitation pulse or pulses results in immediate laser action having power at least several orders of magnitude over that achieved in the prior art.

In one embodiment, the apparatus provides a single shaped excitation pulse having two segments, a first segment of said excitation pulses produces a plasma having a high electron density, in order to optimize the production of ions, and a second segment of the excitation pulse maintains the electron temperature in the plasma high enough to prevent recombination until the electron density has fallen by plasma expansion into the optimum range for laser action.

BRIEF DESCRIPTION OF THE DRAWING

A complete understanding of the present invention may be gained from a consideration of the detailed description presented hereinbelow in connection with the accompanying drawings in which.

DETAILED DESCRIPTION

Figure 1:
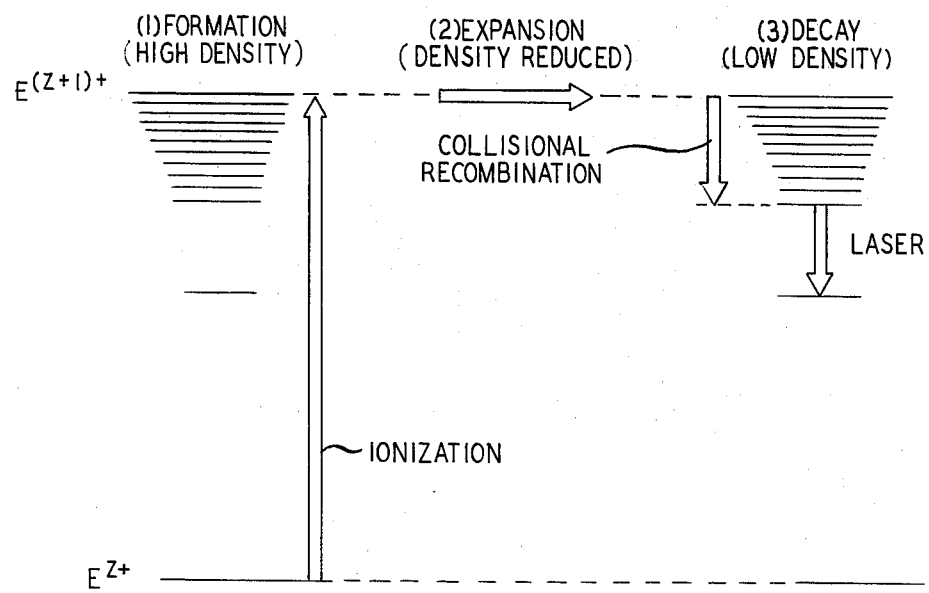
FIG. 1 shows, in pictorial form, the physical principals upon which a plasma-recombination laser operates.
Figure 2:
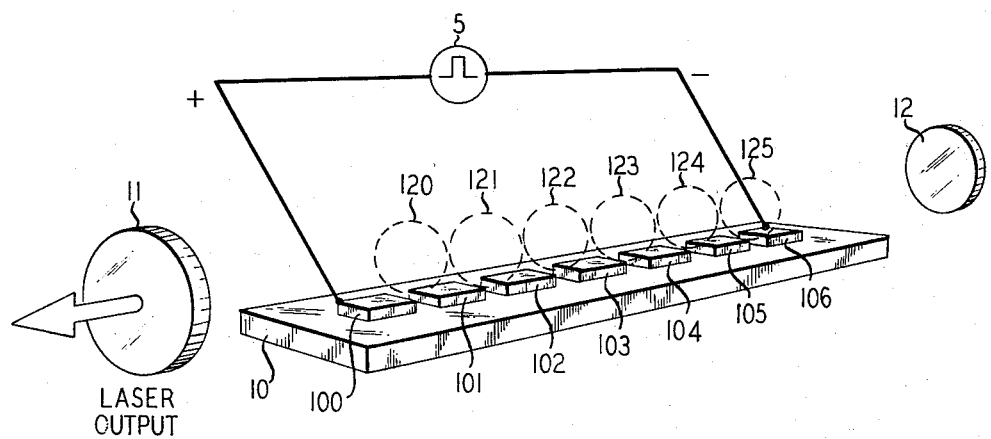
FIG. 2 shows, in pictorial form, an embodiment of a segmented-plasma-excitation-recombination (SPER) laser.

FIG. 2 shows a segmented-plasma-excitation-recombination laser. A typical device comprises a number of 1 mm thick by 2 mm wide by 12 mm long strips 100-106, of a lasing species positioned end-to-end on an insulating substrate 10 in such a manner as to leave a 2 mm gap between each pair of strips. When a 15 kV, 50-150 ampere, pulse of 2.5 $\mu$sec duration from voltage source 5 is applied to the ends of this series of strips, a high density metal-vapor plasma 120-125 is formed in each gap. Once formed, plasmas 120-125, primarily comprising vaporized strip material, expand spherically away from the gaps and into a resonant cavity filled with helium gas at 2.5-3 Torr. The optic axis of the resonant cavity formed by mirrors 11 and 12 is positioned parallel to and 7 mm above the row of strips.

Figure 3:
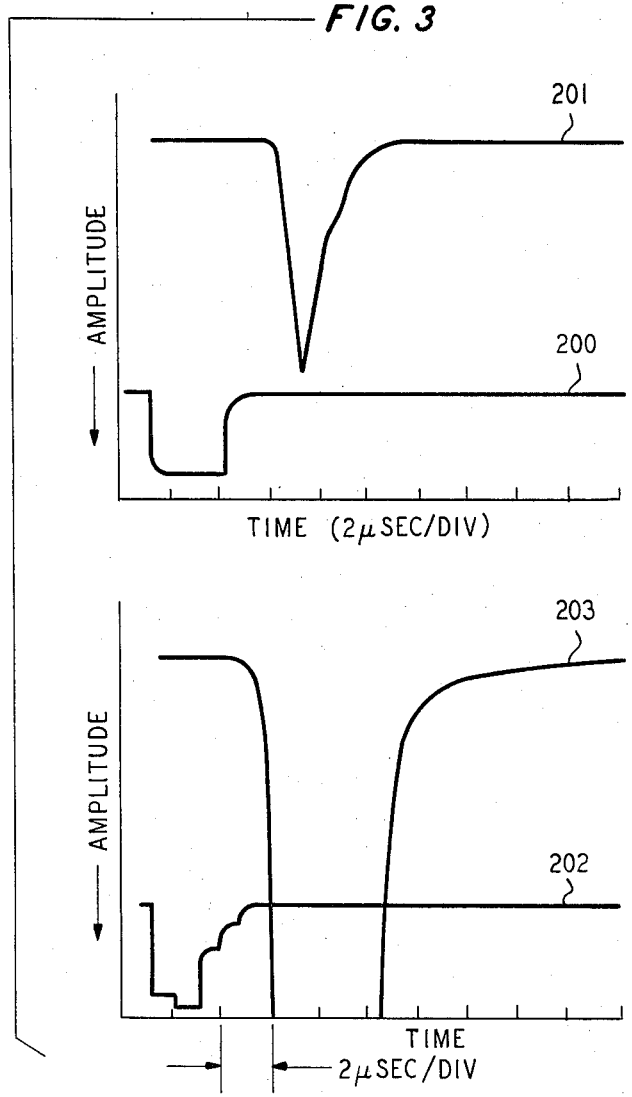
FIG. 3 shows, in graphical form, (with increased intensity downward) the laser output provided by a conventional plasma excitation pulse and the laser output obtained utilizing an excitation pulse generated according to an embodiment of the present invention.

This embodiment of a SPER laser has produced laser action in the ultraviolet, visible and near-infrared at wavelengths between 2983 Å and 1.838 $\mu$m. Curve 200 in FIG. 3 is an oscilloscope trace of the temporal dependence of a 160 amp excitation pulse provided in the prior art. Curve 201 in FIG. 3 shows an oscilloscope trace of the temporal dependence of the laser intensity from a SPER laser operating on the 3008 Å transition in InIII produced by the excitation pulse of curve 200. Increasing laser intensity is in the downward direction. The excitation pulse of curve 200 had an approximately 3 $\mu$sec duration with a rapidly falling trailing edge. Curve 202 in FIG. 3 shows the oscilloscope trace of the temporal dependence of a 160 amp excitation pulse generated according to an embodiment of the present invention. Curve 203 shows an oscilloscope trace of the laser intensity obtained from the same SPER laser that generated curve 201. The dramatic increase in power output is directly attributed to the degree of control of the electron recombination rate in the plasma achieved with the excitation pulse of curve 202 which was specifically shaped according to the present invention.

Figure 4:
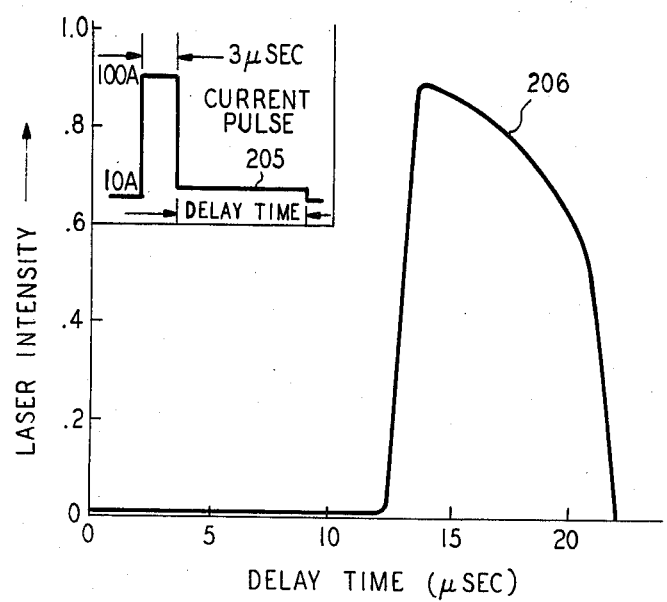
FIG. 4 shows, in graphical form, laser output as a function of the time duration of the second segment of an excitation pulse provided by an embodiment of the present invention with an insert indicating the shape of the current pulse.
Figure 18:
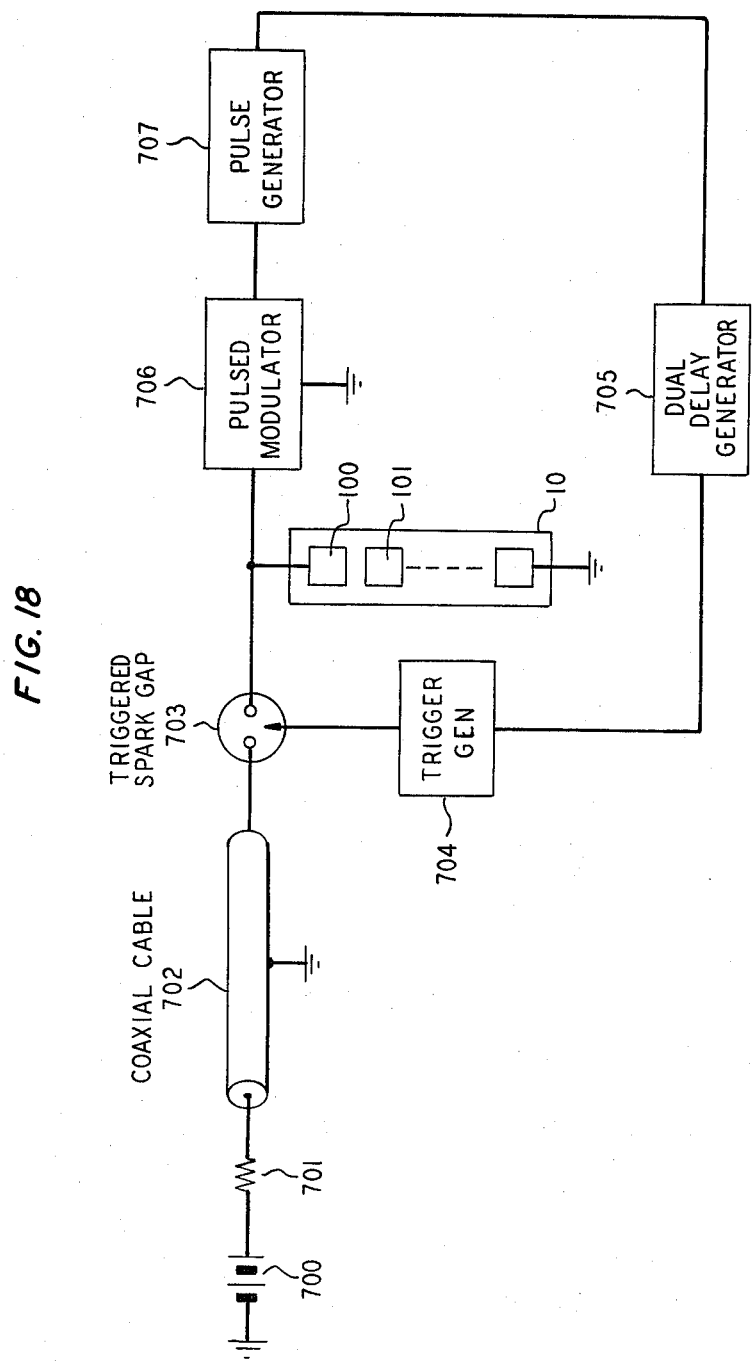
FIG. 18 shows, in pictorial form, a circuit used to generate an excitation pulse according to an embodiment of the present, which excitation pulse is shown as curve 205 in FIG. 4.

The specific function of each of the various parts of the excitation pulse fabricated according to the present invention can be more clearly seen from the results presented in FIG. 4. Excitation pulse 205, generated by the circuit shown in FIG. 18, was applied to a cadmium SPER laser operating on a CdII transition at 5375 Å.

Nanofast Model 568 Dual Delay Generator 705 sent a first pulse to Maxwell Model 40095A Trigger Generator 704. Trigger Generator 704 triggered N-spark gap 703 so that a 100 amp 3 $\mu$sec pulse generated by 0-15 kv dc supply 700, 10 M$\Omega$ resistor 701 and 1500 ft RG-8U coax cable 702 was applied to the SPER laser, i.e. metal strips 100, 101, etc. Dual delay generator 705 sent a second pulse, delayed by 3 $\mu$sec from the first pulse, to Cober Model 606 High Power Pulse Generator 707. Pulse generator 707 put out a pulse having the shape of the lower amplitude portion of curve 205 in FIG. 4. The pulse produced by pulse generator 707 was to Radiation Laboratory Pulsed Modulator Model 9, 1 megawatt for amplification. The amplified pulse was applied to the SPER laser, i.e. metal strips 100, 101, etc. The result was to provide the excitation pulse 205 of FIG. 4 where the delay time of the lower amplitude portion was variable by varying the pulse width output by pulse generator 707. The initial portion of the pulse, 100 amps having a 3 $\mu$sec duration, produces and heats the cadmium plasma. The subsequent portion of excitation pulse 205, having a 10 amp amplitude and a duration variable over a range of 0-25 $\mu$sec, keeps the electron temperature high until the electron density has fallen by plasma expansion to the optimum value for laser action and until uniform mixing of the expanding plasma with the background gas occurs. The end of the current pulse results in the immediate appearance of laser action at 5378 Å, indicated by curve 206 in FIG. 4. The current pulse shaped according to the present invention provides a high degree of control over the gain, power and temporal behavior from the cadmium SPER laser because laser action only occurs after a time delay determined by the delay time of the lower-current portion of the excitation pulse.

Figure 5:
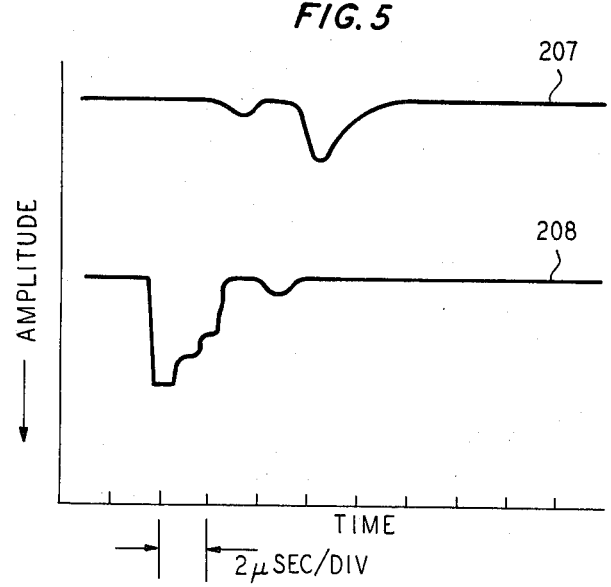
FIG. 5 shows in graphical form, the laser output provided by an excitation pulse generated according to the present invention.

Curve 207 in FIG. 5 shows a graph of the temporal dependence of the spontaneous emission from a SPER laser operating on the 3008 Å transition in InIII. Note that excitation pulse 208 "rings", i.e. repeatedly falls to a 0 current value. The ringing is observed to give rise to a sequence of spontaneous emission pulses. This observation, that line emission can repeatedly be switched on and off, provides direct evidence that the plasma-recombination mechanism can be externally controlled.

As described hereinabove, the essence of the present invention is an apparatus which provides an excitation pulse having a first portion which produces and heats a plasma and at least one further portion which adds energy to the plasma to lower the electron-plasma recombination rate for a sufficient length of time to allow the plasma to expand to an extent which provides optimal laser action. The delay is possible since a completely ionized plasma will not recombine until the plasma electrons are allowed to cool or the plasma hits the walls of an enclosing chamber. It is useful to keep the electron temperature high until the electron density has fallen by plasma expansion to the optimum value for laser action, uniform mixing of the expanding plasma with the background gas has occurred and refractive index gradients, shock waves, etc. have ceased to exist. The use of external control in accordance with the present invention has been used to store energy in the form of ions for periods of up to 25 $\mu$sec and then to switch out said stored energy in a controlled manner. Thus ions can be created slowly and energy can be stored therein for periods of time which are long compared to their untrapped radiative lifetime. This stored energy can thereby be made available when needed. Further embodiments of the present invention are described hereinbelow for providing the desired excitation pulse.

Figure 6:
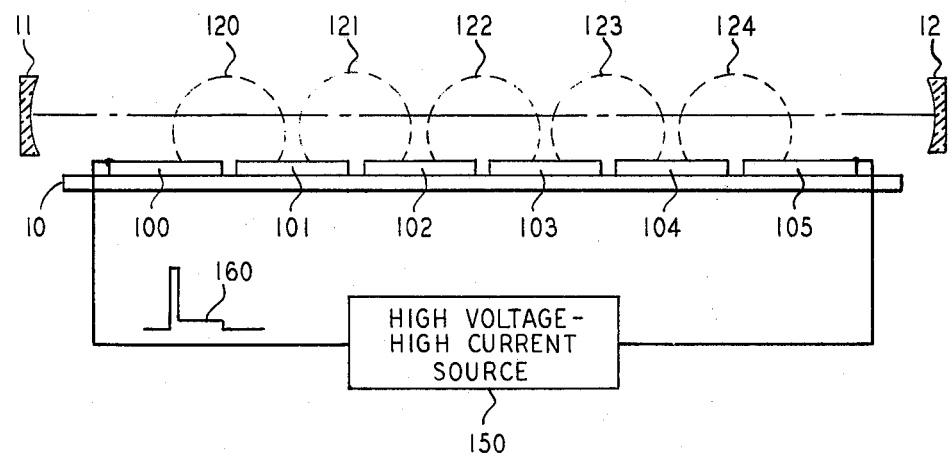
FIGS. 6–7 show, in pictorial form, recombination lasers constructed according to the present invention.

FIG. 6 shows a SPER laser having metal segments 100-105 affixed to insulating substrate 10. High voltage-high current pulse source 150 applies current pulse 160 to strip 100 and strip 105. The application of pulse 160 produces plasmas 120-124, which plasmas expand into the laser cavity formed by mirrors 11 and 12. The first, high current portion of pulse 160 produces plasmas 120-124 and the lower current portion of pulse 160 heats plasmas 120-124 for a sufficient length of time so that the expansion of the plasmas into the laser cavity provides the appropriate electron density for recombination and thereby laser action.

Figure 7:
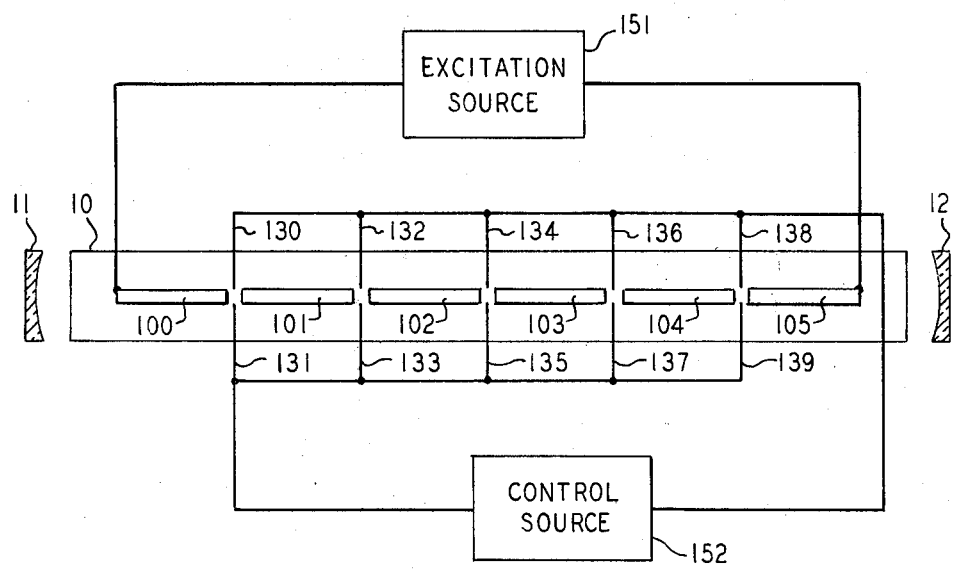

FIG. 7 shows another embodiment of the present invention. Metal strips 100-105 are affixed to insulating substrate 10. Excitation source 151 applies a high voltage, high current pulse to metal strips 100 and 105. The application of this pulse produces a plasma in the gaps between the metal strips, which plasma expands into the laser cavity formed by mirrors 11 and 12. Pairs of control electrodes 130-139 are placed in close proximity to the gaps between the metal strips. Control source 152 applies a current pulse across each gap which current pulse has a different amplitude than the amplitude of the current pulse produced by excitation source 151. The length of current pulse 152 is longer in time duration than the current pulse produced by excitation source 151. The combination of excitation source pulse and control source pulse provides the requisite excitation input as described hereinabove according to the present invention.

Figure 8:
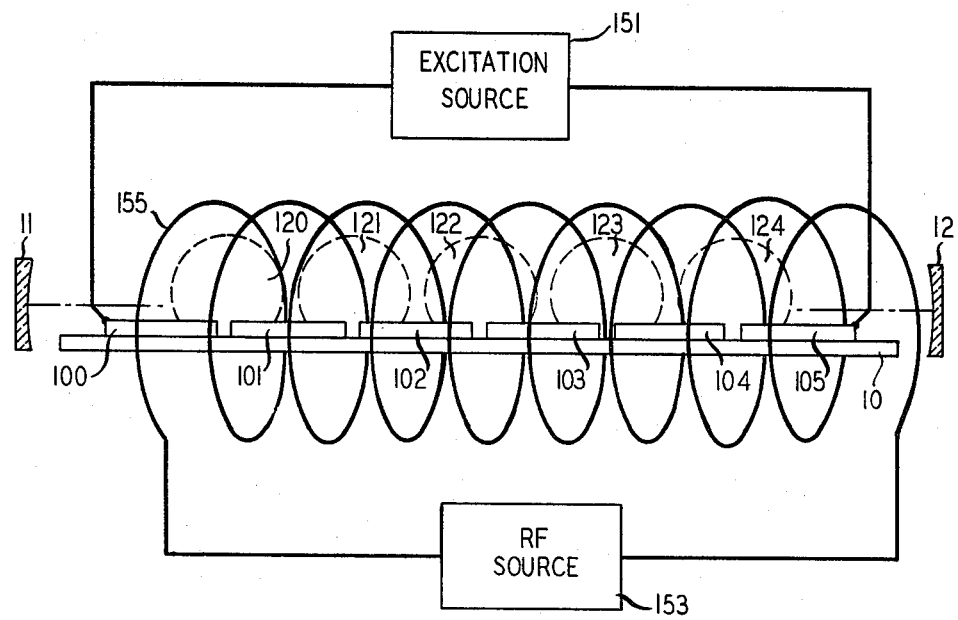

FIG. 8 shows another embodiment of the present invention. Metal strips 100-105 are affixed to insulating strip 10. Excitation source 151 applies a high voltage, high current pulse to metal strips 100 and 105. This produces plasmas 120-124, which plasmas expand into the laser cavity formed by mirrors 11 and 12. Rf source 153 applies a signal to coil 155 to produce an rf electromagnetic field. Energy from the rf field is absorbed by plasmas 120-124. The excitation current pulse provided by excitation source 151 and the energy from the rf field produced by rf source 153 combine to form the requisite excitation pulse according to the present invention as described hereinabove.

Figure 9:
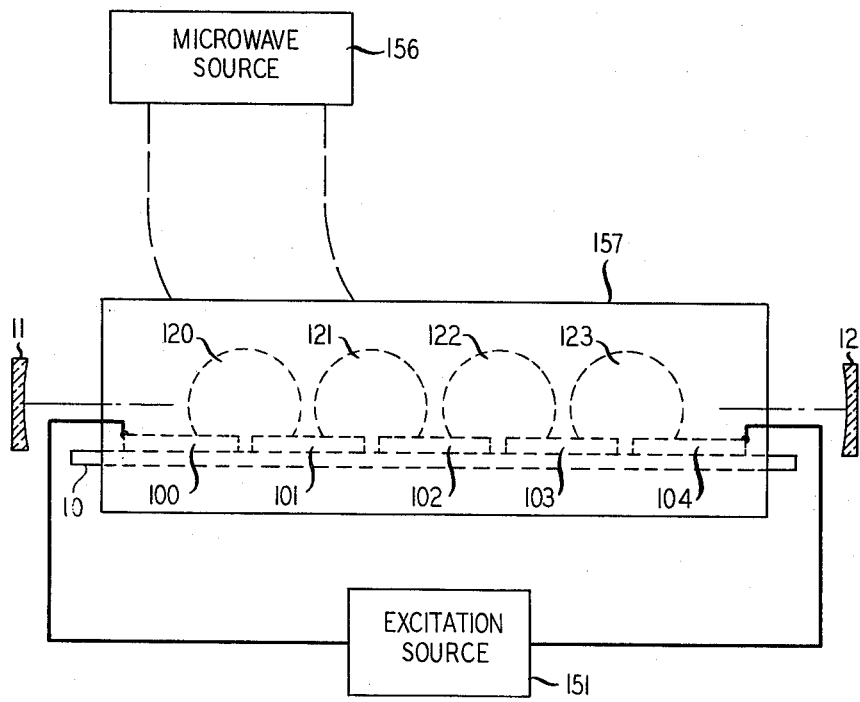

FIG. 9 shows another embodiment of the present invention. Metal strips 100-104 are affixed to insulating substrate 10. Excitation source 151 applies a high voltage, high current pulse to metal strips 100 and 104. This produces plasmas 120-123. These plasmas expand into the laser cavity formed by mirrors 11 and 12. Microwave source 156 applies energy to microwave waveguide 157. Microwave waveguide 157 is disposed about the laser cavity in such a manner so as to encompass 120-123. Microwave energy generated in microwave waveguide 157 is absorbed by plasmas 120-123. The excitation current pulse provided by excitation source 151 and the excitation provided by microwave source 156 combine to form the requisite excitation pulse according to the present invention as described hereinabove.

Figure 10:
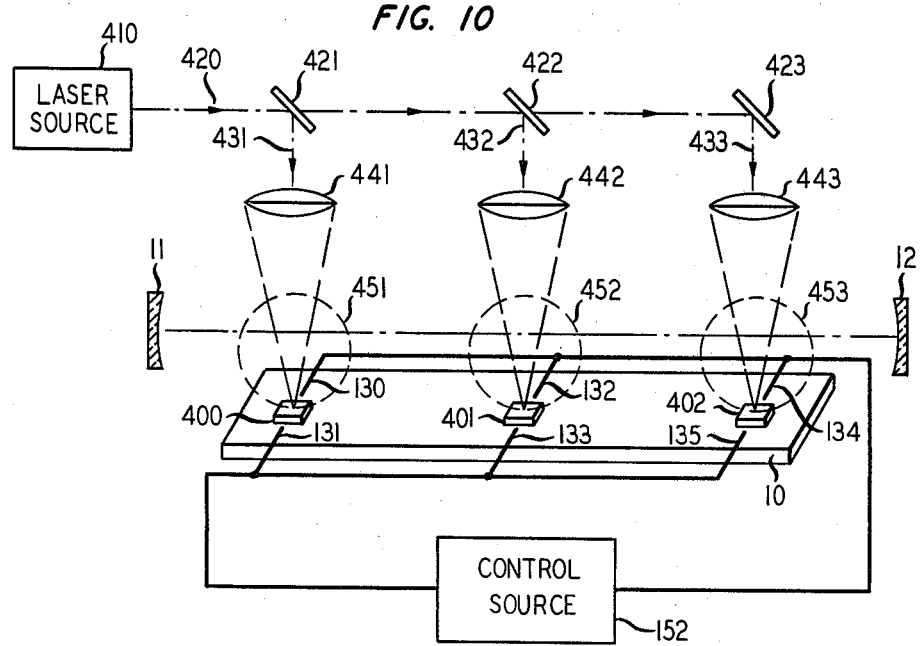

FIG. 10 shows a further embodiment of the present invention. Target material 400-402 is affixed to insulating substrate 10. Laser source 410 produces laser beam 420. Laser beam 420 impinges upon partially reflecting, partially transmitting mirrors 421-423 to form laser beams 431-433. Laser beams 431-433 are focused by lenses 441-443 onto targets 400-402 respectively. This produces plasmas 451-453. Plasmas 451-453 expand into the laser cavity formed by mirrors 11 and 12. Pairs of control electrodes 130-135 are disposed on insulating substrate 10 in the region of targets 400-402. Control source 152 applies a current pulse to pairs of electrodes 130-135, which current pulse adds energy to plasmas 451-453. The combination of the application of laser radiation and the current pulse from control source 152 forms the requisite excitation pulse according to the present invention as described hereinabove.

Figure 11:
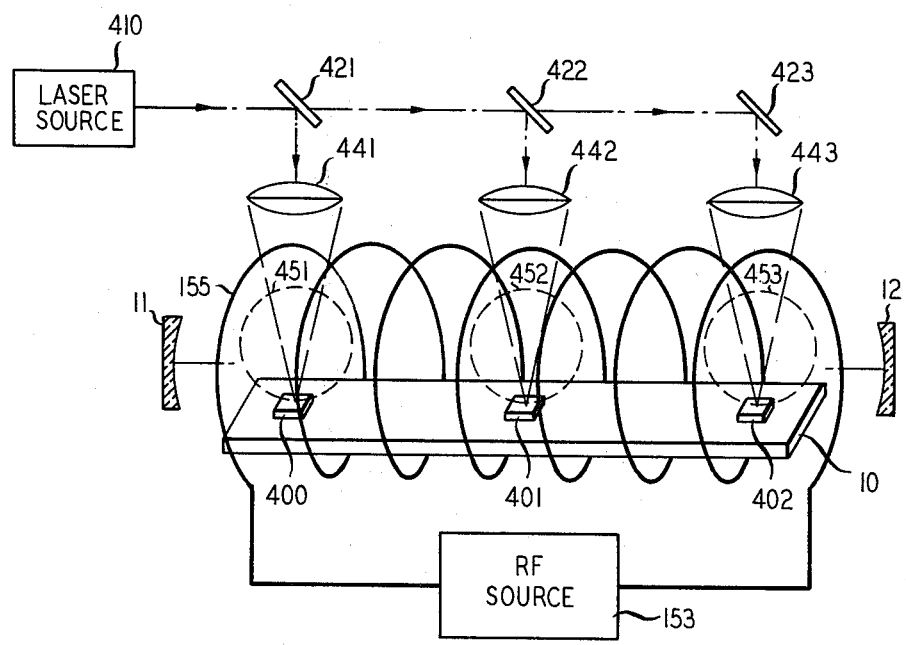
Figure 12:
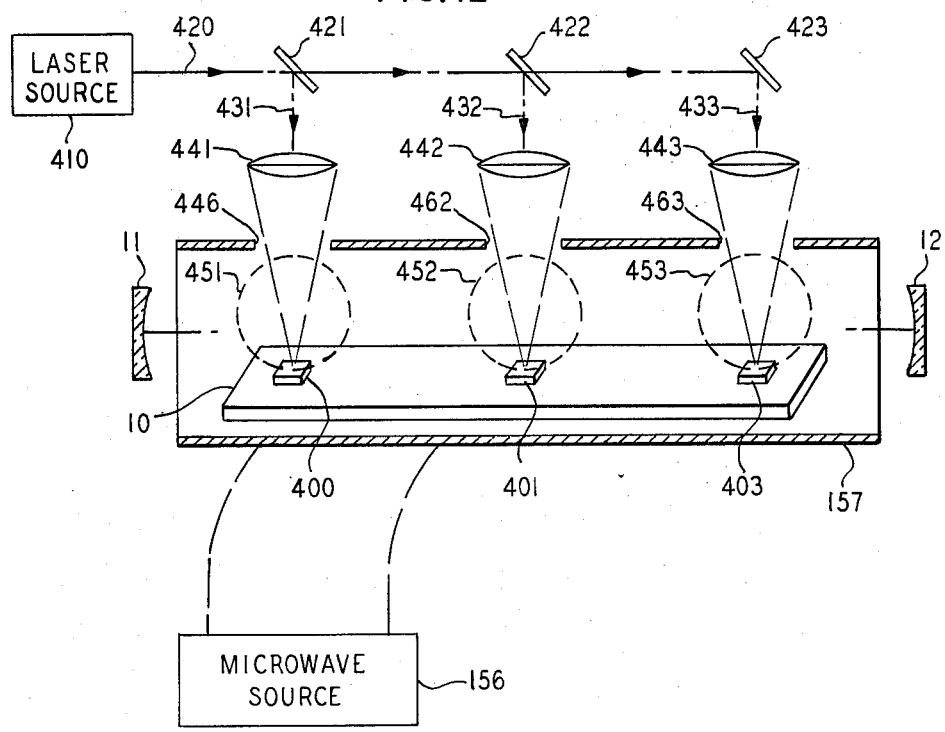

FIGS. 11 and 12 show further embodiments of the present invention which are analogous to the embodiment shown in FIG. 10 in that laser source 410 provides an excitation pulse which forms plasmas 451-453 as has been described hereinabove with respect to FIG. 10. (Of course, in FIG. 12, microwave waveguide 156 requires apertures 461-463 to allow laser radiation to pass into microwave waveguide 157.) In FIG. 11 rf source 153 and rf coil 155 provide the same function as has been described hereinabove with respect to the embodiment shown in FIG. 8. In FIG. 12, microwave source 156 and microwave waveguide 157 provides the same function as has been described hereinabove with respect to the embodiment shown in FIG. 9.

At very short wavelengths, because of the lack of efficient laser cavities, lasers probably will produce pulses of radiation via amplified spontaneous emission. Under these circumstances the ability to externally control the temporal behavior of the laser gain will be crucial. Such a "travelling-wave" recombination laser might take one of the embodiments shown in FIGS. 13 and 14.

Figure 13:
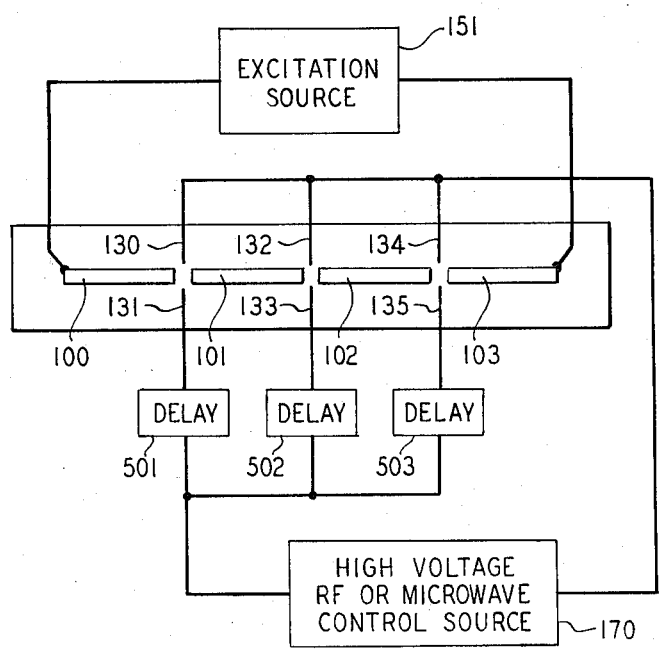

FIG. 13 shows another embodiment of the present invention. Metal strips 100-103 are affixed to insulating substrate 10. Excitation pulse 151 applies a high voltage, high current pulse to metal strips 100 and 103. Apparatus 170 is a means for applying a second portion of an excitation pulse to the plasma produced at the gaps between metal strips 100-103. In FIG. 13 the excitation pulse is shown as being applied by control electrode pairs 130-135, as has been shown previously in FIG. 7 and described hereinabove in the discussion of the embodiment shown therein. The portion of the excitation pulse applied to the gaps is delayed by delay means 501-503. The delay means are arranged so that delay (501)>delay(502)>delay(503). This arrangement of delay times is such that laser action is formed in a travelling wave across the laser cavity. Apparatus 170 may be a high voltage, high current source when the control electrodes are used to apply the second portion of the excitation pulse, or it may be an rf source as shown in FIG. 8 or a microwave source as shown in FIG. 9.

Figure 14:
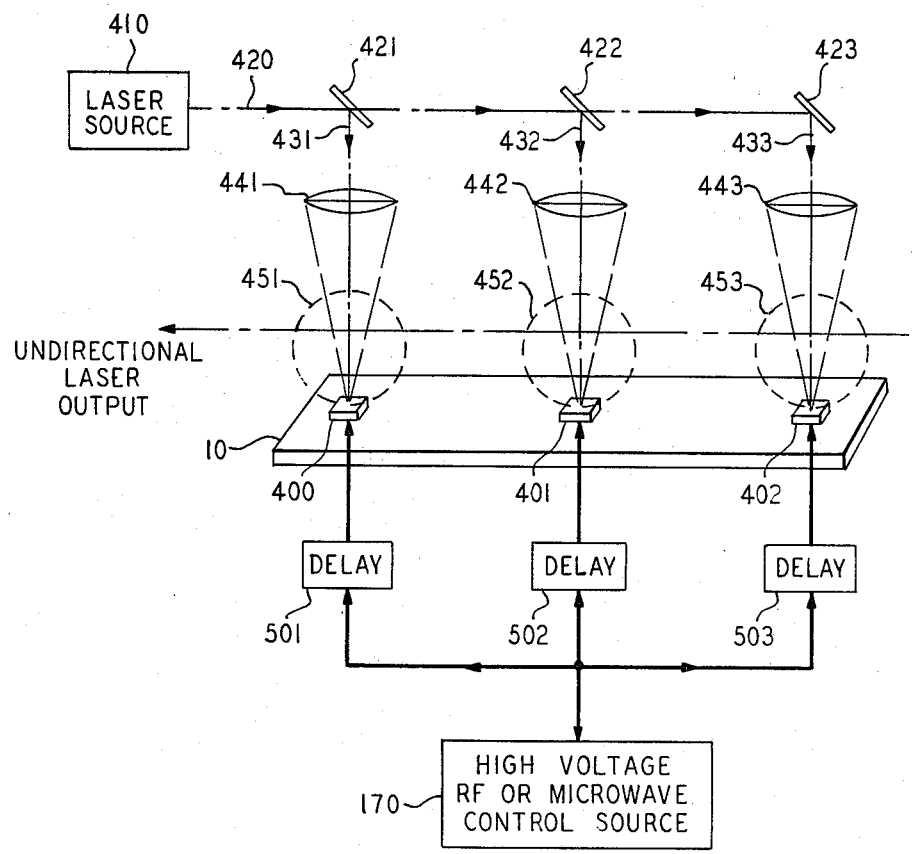

FIG. 14 shows an embodiment of the present invention which is analogous to that shown in FIG. 13 where the plasmas are formed by the use of laser-induced plasma formation according to the discussion of FIG. 10.

Figure 15:
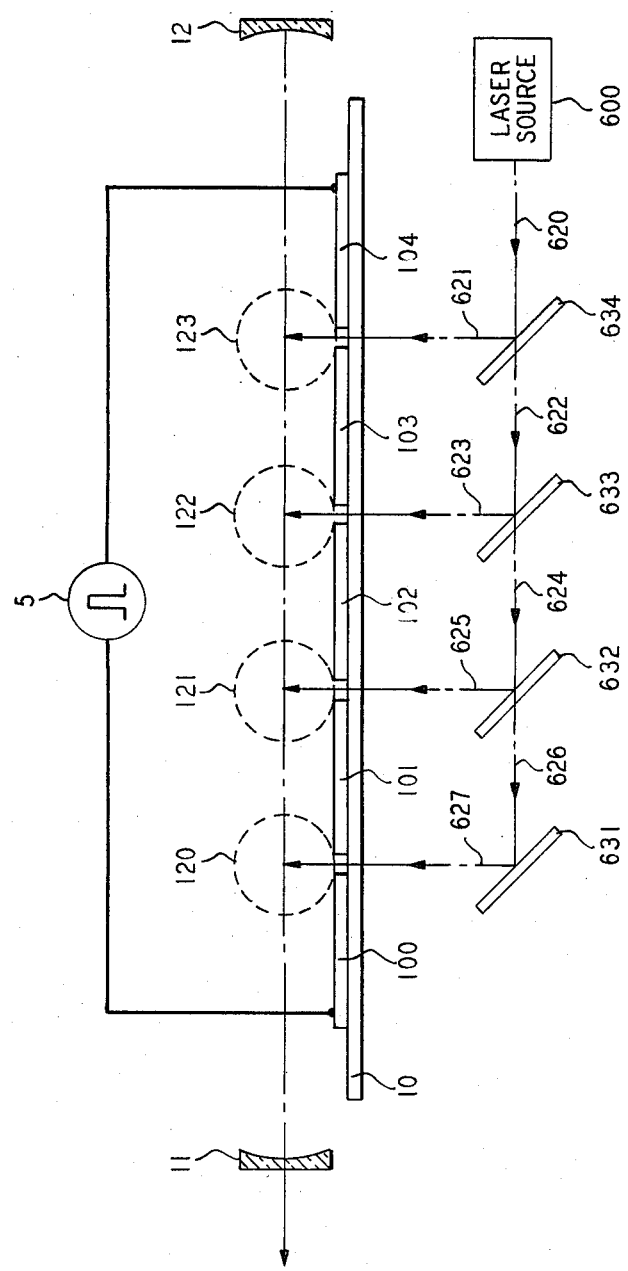

FIG. 15 shows an embodiment of the present invention which is analogous to that shown in FIG. 6 whereby plasmas 120-123 are formed by the application of a high voltage, high current pulse from pulse source 5. Laser radiation beam 620 emitted by long wavelength laser 600 is passed through beam splitters 631-634 and directed to impinge upon plasmas 120-123 respectively. The laser radiation is used to provide the controlled absorption of energy in accordance with the present invention.

Figure 16:
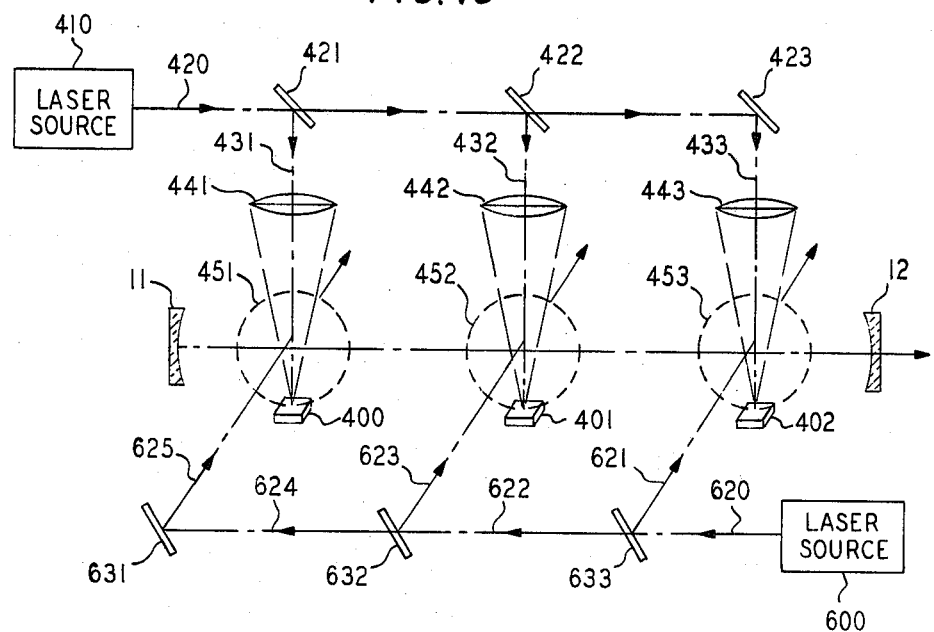

FIG. 16 shows an embodiment of the present invention which is analogous to that shown in FIG. 10 whereby plasmas 451-453 are formed by the application of laser radiation from laser source 410. Laser radiation beam 620 emitted by long wavelength laser 600 is passed through beam splitters 631-633 and directed to impinge upon plasmas 451-453 respectively. The laser radiation from laser source 600 is used to provide the controlled absorption of energy in accordance with the present invention.

Figure 17:
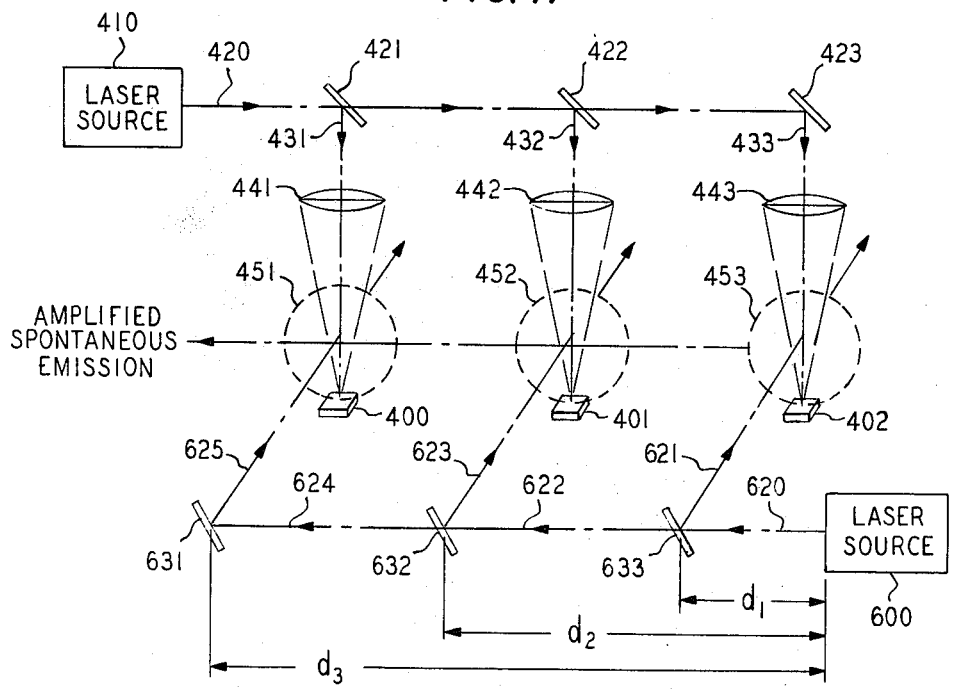

FIG. 17 shows an amplified-spontaneous emission embodiment of the present invention which is analogous to that shown in FIG. 14 whereby plasmas 451-453 are formed by the laser radiation from laser source 410. Laser radiation beam 720 emitted by long wavelength laser 600 is passed through beam splitters 631-633 and directed to impinge upon plasmas 451-453 respectively. Beam splitters 631-633 and targets 400-402 are spaced at intervals so that radiation from beam 621 is delayed from impinging upon plasma 453 less than the delay for beam 623 impinging upon plasma 452 which is in turn delayed less than the delay for beam 625 impinging upon plasma 451. This arrangement of delay times is such that laser action is formed in a travelling wave across the laser cavity.

What is claimed is:

1. A plasma-recombination laser which comprises a resonant laser cavity;
   means for producing a plasma laser medium in said resonant laser cavity;
   characterized in that
   said means for producing a plasma laser medium comprises a material, and means for applying energy to said material in at least two times segments such that the energy during a first time segment is sufficient to produce a plasma from said material, which plasma expands into said resonant laser cavity, and the energy during a second time segment maintains the electron temperature of said plasma high enough to prevent substantial electron-ion recombination in said plasma until recombination is desired.

2. A plasma-recombination laser in accordance with claim 1 wherein said material is disposed in at least one series of strips positioned end-to-end on an insulating substrate so as to leave a gap between at least one pair of strips.

3. A plasma-recombination laser in accordance with claim 2 wherein said means for applying energy comprises a pulse generator for applying a high voltage-high current electrical pulse to said at least one series of strips.

4. A plasma-recombination laser in accordance with claim 2 wherein said means for applying energy comprises first electrical means for applying a high voltage-high current electrical pulse to said at least one series of strips; a multiplicity of pairs of electrodes, each of said pairs of electrodes having a gap therebetween, said gap being disposed in the vicinity of the gap between said strips; and second electrical means for applying a second electrical pulse to said multiplicity of pairs of electrodes during said second time segment.

5. A plasma-recombination laser in accordance with claim 2 where, said means for applying energy comprises first electrical means for applying a high voltage-high current electrical pulse to said at least one series of strips; and means for generating an rf field to surround said at least one series of strips during said second time segment, whereby energy is transferred during said second time segment from said rf field to said plasma.

6. A plasma-recombination laser in accordance with claim 2 wherein said means for applying energy comprises first electrical means for applying a high voltage-high current electrical pulse to said at least one series of strips; a microwave waveguide surrounding said at least one series of strips; and a microwave source for generating a microwave field in said waveguide during said second time segment, whereby energy is transferred during said second time segment from said microwave field to said plasma.

7. A plasma-recombination laser in accordance with claim 1 wherein said material comprises at least two spaced apart strips;
   said means for applying energy comprises a laser source of laser radiation;
   means for forming separate beams from said laser radiation and directing said beams to impinge upon said at least two strips;
   a multiplicity of pairs of electrodes, each of said pairs of electrodes having a gap therebetween, said gap being disposed in the vicinity of said strips; and means for applying an electrical pulse to said multiplicity of pairs of electrodes during said second time segment.

8. A plasma-recombination laser in accordance with claim 1 wherein said material comprises at least two spaced apart strips;
   said means for applying energy comprises a laser source of laser radiation;
   means for forming separate beams from said laser radiation and directing said beams to impinge upon said at least two strips; and
   means for generating an rf field surrounding said at least two strips during said second time segment, whereby energy is transferred during said second time segment from said rf field to said plasma.

9. A plasma-recombination laser in accordance with claim 1 wherein said material comprises at least two spaced apart strips;
   said means for applying energy comprises a laser source of laser radiation;
   means for forming separate beams from said laser radiation and directing said beams to impinge upon said at least two strips;
   a microwave waveguide surrounding said at least two strips; and
   a microwave source for generating a microwave field in said waveguide during said second time segment, whereby energy is transferred during said second time segment from said microwave field to said plasma.

10. A plasma-recombination laser in accordance with claim 2 wherein said means for applying energy comprises electrical means for applying a high voltage-high current electrical pulse to said at least one series of strips to form plasmas in said gaps;
    a laser source of laser radiation; and
    means for forming separate beams from said laser radiation and directing said beams to impinge upon said plasmas during said second time segment.

11. A plasma-recombination laser in accordance with claim 1 wherein said material comprises at least two spaced apart strips;
    said means for applying energy comprises a first laser source of laser radiation;
    means for forming separate beams from said first laser radiation and directing said beams to impinge upon said at least two strips to form plasmas;
    a second laser source of second laser radiation; and
    means for forming separate beams from said second laser radiation and directing said beams to impinge upon said plasmas during said second time segment.

* * * * *